US011555992B2

(12) United States Patent
Chen et al.

(10) Patent No.: US 11,555,992 B2
(45) Date of Patent: Jan. 17, 2023

(54) PROGRAMMABLE ANNULAR LED ILLUMINATION-BASED HIGH EFFICIENCY QUANTITATIVE PHASE MICROSCOPY IMAGING METHOD

(71) Applicant: NANJING UNIVERSITY OF SCIENCE AND TECHNOLOGY, Jiangsu (CN)

(72) Inventors: Qian Chen, Nanjing (CN); Chao Zuo, Nanjing (CN); Jiasong Sun, Nanjing (CN); Shijie Feng, Nanjing (CN); Yuzhen Zhang, Nanjing (CN); Guohua Gu, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 366 days.

(21) Appl. No.: 16/633,037

(22) PCT Filed: Feb. 26, 2018

(86) PCT No.: PCT/CN2018/077235
§ 371 (c)(1),
(2) Date: Jan. 22, 2020

(87) PCT Pub. No.: WO2019/024491
PCT Pub. Date: Feb. 7, 2019

(65) Prior Publication Data
US 2020/0209604 A1 Jul. 2, 2020

(30) Foreign Application Priority Data
Aug. 4, 2017 (CN) .......................... 201710660188.6

(51) Int. Cl.
*G02B 21/06* (2006.01)
*G02B 21/36* (2006.01)
*G02B 21/00* (2006.01)

(52) U.S. Cl.
CPC .......... *G02B 21/06* (2013.01); *G02B 21/0056* (2013.01); *G02B 21/361* (2013.01)

(58) Field of Classification Search
CPC ...... G02B 21/06; G02B 21/361; G02B 21/00; G02B 21/0004; G02B 21/0016;
(Continued)

(56) References Cited

U.S. PATENT DOCUMENTS 7,787,588 B1 * 8/2010 Yun ...................... G01N 23/046
250/311
9,594,941 B2 * 3/2017 Ishiwata ............ G01N 15/1475
(Continued)

FOREIGN PATENT DOCUMENTS

CN 101493934 A 7/2009
CN 102781327 A 11/2012
(Continued)

OTHER PUBLICATIONS

Jenkins et al., "Quantitative phase microscopy via optimized inversion of the phase optical transfer function", Applied Optics, vol. 54, No. 28, Oct. 1, 2015, p. 8566-8579.
(Continued)

*Primary Examiner* — Thong Q Nguyen
(74) *Attorney, Agent, or Firm* — Birch, Stewart, Kolasch & Birch, LLP

(57) ABSTRACT

The invention discloses a programmable annular LED illumination-based high efficiency quantitative phase microscopy imaging method, the proposed method comprising the following steps: the derivation of system optical transfer function in a partially coherent illumination imaging system;
(Continued)

the derivation of phase transfer function with the weak object approximation under the illumination of tilted axially symmetric coherent point illumination source; the extension of illumination from an axially symmetric coherence point source to a discrete annular point source, and the optical transfer function can be treated as an incoherent superposition of each pair of tilted axially symmetric coherent point sources. The acquisition of raw intensity dataset; the implementation of deconvolution for quantitative phase reconstruction. The invention derives the system phase transfer function under the tilted axially symmetric point light source in the case of partially coherent illumination, and promotes the optical phase transfer function of the discrete annular point light source. The programmability characteristic of LED array enables the annular illumination aperture to be flexibly adjustable, being applicable to different microscopic objects with different numerical apertures, and improving the compatibility and flexibility of the system.

5 Claims, 5 Drawing Sheets

(58) Field of Classification Search
CPC ............ G02B 21/0032; G02B 21/0052; G02B 21/0056; G02B 21/006; G02B 21/008; G02B 21/14; G02B 21/26; G02B 21/368

USPC .................................................. 359/368–389
See application file for complete search history.

(56) References Cited

U.S. PATENT DOCUMENTS

| | | | | |
|---|---|---|---|---|
| 10,679,763 | B2* | 6/2020 | Zheng | .................. G02B 21/365 |
| 11,106,029 | B2* | 8/2021 | Chen | ....................... G02B 21/06 |
| 11,487,096 | B2* | 11/2022 | Chen | ....................... G02B 21/14 |
| 2017/0146788 | A1 | 5/2017 | Waller et al. | |

FOREIGN PATENT DOCUMENTS

| | | |
|---|---|---|
| CN | 105158887 A | 12/2015 |
| CN | 106768396 A | 5/2017 |
| CN | 106842540 A | 6/2017 |
| CN | 107290846 A | 10/2017 |

OTHER PUBLICATIONS

Tian et al., "Quantitative differential phase contrast imaging in an LED array microscope", Optics Express, vol. 23, No. 9, Apr. 22, 2015, p. 11394-11403.

* cited by examiner

PROGRAMMABLE ANNULAR LED ILLUMINATION-BASED HIGH EFFICIENCY QUANTITATIVE PHASE MICROSCOPY IMAGING METHOD

TECHNICAL FIELD

The invention relates to optical microscopic measurement and imaging technology, and more specifically to a programmable annular LED illumination-based high efficiency quantitative phase microscopy imaging method.

BACKGROUND

Phase retrieval is an important technology for optical measurement and imaging, and plays an important role in biomedical and industrial inspections. The most classical quantitative phase measurement method is interferometry (Cuche E, Bevilacqua F, Depeursinge C. Digital holography for quantitative phase-contrast imaging [J]. Optics letters, 1999, 24(5): 291-293.), and this kind of technique usually use a laser light source for beam splitting to generate two beams of light. In the interferometry setup, object beam passing through a sample and interfering with reference beam to generate interference fringes, and the phase delay of the object can be obtained through demodulation algorithm. However, interferometry is particularly disadvantageous: (1) interferometry generally requires a highly coherent light source (such as a laser), which requires a more complex interference device; (2) the introduction of additional reference optical paths leads to demanding requirements for the measurement environment; (3) the speckle coherent noise introduced by the highly coherent light source limits the spatial resolution and measurement accuracy of an imaging system.

Different from the traditional quantitative phase imaging based on interferometry, phase retrieval can realize quantitative phase acquisition without optical interference. By measuring the amplitude/intensity of an optical wave field, using the intensity distribution on different axial planes to calculate the phase distribution of an object and using the transport of intensity equation to solve phase is a typical direct phase retrieval method (Teague M R. Deterministic Phase retrieval: A Green's function solution[J]. JOSA, 1983, 73 (11): 1434-1441.). The transport of intensity equation is a second order elliptical partial differential equation, which illustrates the quantitative relationship between the intensity change along an optical axis and the phase of wave field plane which is perpendicular to the optical axis. A series of intensity images along the axial direction are captured, and then the central differential equation is used to obtain the intensity axial differential and the intensity distribution at the focusing position. Finally, the phase information can be directly obtained by numerically solving the transport of intensity equation. Compared with interferometry and iterative phase recovery method, the main advantages of the method of the transport of intensity equation are: (1) non-interference, directly resolving phase information by measuring surface intensity, without introducing additional reference light; (2) non-iterative, obtaining a phase by directly resolving differential equation; (3) being well applied to white light illumination, such as Kohler illumination in traditional bright field microscopy; (4) direct acquisition of the absolute distribution of phase positions without phase unwrapping and no presence of $2\pi$ phase wrapping problem in general interferometry; (5) no need of complex optical system, no harsh requirements for experimental environment and being insensitive to vibration.

In Kohler illumination system, with the increasing of illumination numerical aperture, the optical imaging system changes from coherent illumination to partially coherent illumination, as shown in FIG. 1(a)-(c). The final imaging resolution will increase as well, but the phase contrast of captured intensity images will be poor and difficult to be observed, so the general illumination numerical aperture is set to 70% to 80% of the numerical aperture of an objective lens to obtain the optimal phase contrast effect, and this instruction can be found in most microscope manuals. The reason for this conclusion is that when the coherence parameter of an microscopic imaging system (which is defined as the ratio of the numerical aperture of illumination to the numerical aperture of an objective lens, $\sigma = NA_{ill}/NA_{obj}$; when $\sigma \neq 0$ an imaging system is a coherent illumination system and when $\sigma \leq 1$, the imaging system is partially coherent illumination system) increases, the response value of the system transfer function is continuously attenuated, resulting in weakened image contrast. The cutoff frequency of transfer function is continuously extended to 2× objective lens resolution, but the phase contrast of image intensity gradually becomes weak with the increasing image resolution. There is a trade-off between imaging resolution and the phase contrast of intensity image. In the case of coherent illumination, the phase contrast of the intensity image is the strongest, but the imaging resolution at this time is determined only by the numerical aperture of the objective lens. When coherence parameter $\sigma = 1$, imaging resolution can be extended to twice the numerical aperture resolution of the objective lens, but the phase contrast in the intensity image is too weak to capture. Although partially coherent illumination has been introduced into quantitative phase imaging based on the transport-of-intensity equation (Gureyev T E, Roberts A, Nugent K A. Partially coherent fields, the transport-of-intensity equation, and phase uniqueness [J]. JOSA A, 1995, 12(9): 1942-1946. [2] Paganin D, Nugent K A. Noninterferometric phase imaging with partially coherent light [J]. Physical review letters, 1998, 80(12): 2586.), a compromise between imaging resolution and detectable image contrast cannot be avoided. As a new type of illumination controlling mode in recent years, the illumination based on LED array makes the means and methods of microscopic imaging more flexible and convenient. (Zheng G, Horstmeyer R, Yang C. Wide-field, high-resolution Fourier ptychographic microscopy [J]. Nature photonics, 2013, 7(9): 739-745. [2] Zuo C, Sun J, Zhang J, et al. Lensless phase microscopy and diffraction tomography with multi-angle and multi-wavelength illuminations using a LED matrix [J]. Optics express, 2015, 23(11): 14314-14328.). Thus, how to break through the traditional circular Kohler illumination mode and achieve twice the objective lens resolution in quantitative phase imaging with robust phase contract in the captured intensity images becomes a technical problem in quantitative phase imaging technology.

SUMMARY

The purpose of this invention is to provide a programmable annular LED illumination-based high efficiency quantitative phase microscopy imaging method. This method not only achieves an imaging resolution twice as large as that of an objective lens numerical aperture, but also enables the response of the phase transfer function of an imaging system to have strong robustness. It improves the quantitative phase imaging quality and reconstruction results, and has high compatibility with traditional microscopes. So the present quantitative phase microscopic imaging method greatly improves the efficiency of quantitative phase imaging technology.

A technical solution for achieving the object of the present invention is: a programmable annular LED illumination-based high efficiency quantitative phase microscopy imaging method, characterized in the steps as follows:

Step one, the derivation of optical transfer function for a partially coherent imaging system; considering that the optical pupil functions of the illumination source and microscopic objective are symmetric about the optical axis, the optical transfer function under a weak object approximation in a partially coherent illumination imaging system can be derived;

Step two, the derivation of the phase transfer function under weak object approximation for a tilted axially symmetric coherent point illumination source; when the illumination degenerates from a circular partially coherent illumination pattern to a tilted axially symmetric coherent point source, the two axially symmetric discrete coherent point sources are matched with the pupil edge of an objective lens, respectively; then these two tilted axially symmetric coherent point sources are mapped to the LED array on the source plane, and the optical transfer function of the imaging system under a weak object approximation can be calculated and finally, the phase contrast intensity image containing phase information is generated by introducing defocus, so that the phase information of a sample can be transmitted to the defocus intensity image;

Step three, the extension of illumination from an axially symmetric coherence point source to a discrete annular point source; any axially symmetric partially coherent illumination source can be decomposed into a plurality of axially symmetric discrete coherent point sources on the source plane, and the optical transfer function can be treated as an incoherent superposition of each pair of tilted axially symmetric coherent point sources, and when the illumination source is in the shape of a discrete annular illumination pattern composed of discrete LED, the optical transfer function of the annular illumination pattern under the discrete condition can be obtained as well;

Step four, the acquisition of raw intensity dataset; when the annular LED illumination pattern matches the objective lens pupil, the camera is used for the acquisition of two defocus intensity images and an in-focusing intensity image with the movement of stage along the optical axis direction;

Step five, the implementing of deconvolution for quantitative phase reconstruction; three intensity images acquired by the camera are subjected to central axial intensity difference, and the absorption components in the intensity images are removed; and then the Fourier transform is performed, and this transform is corresponding to the dividing of phase transfer function in the frequency domain; moreover, the regularization parameter is added to prevent the occurrence of dividing zero; finally, the inverse Fourier transform is performed to obtain the quantitative phase microscopic image based on annular LED illumination.

Compared with the prior technique, the present invention has significant advantages: (1) deriving the system phase transfer function under tilted axis symmetric point light source in a partially coherent illumination, and promoting to the optical phase transfer function of the discrete annular point light source; (2) proposing an annular illumination mode in discrete cases and applying it to a quantitative phase imaging method; (3) introducing annular illumination into a microscopic imaging system, and adding a condenser to the imaging system not only improves the light energy utilization rate of the system, but also makes the numerical aperture of the system illumination reach 0.95 or more; (4) the programmable control method for an LED array enables the annular illumination aperture to be flexibly adjustable, being applicable to microscopic objects having different numerical apertures, and improving the compatibility and flexibility of the system.

The invention will be further described in detail with reference to the following description and the accompanying drawings.

THE EMBODIMENTS

Figure 2:
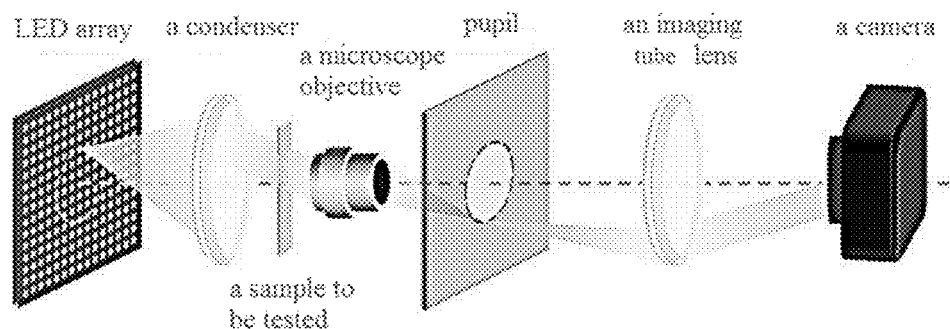
FIG. 2 is a schematic diagram of a microscope optical path based on a programmable annular LED illumination based quantitative phase imaging.

As shown in FIG. 2, the present invention is a programmable annular LED illumination-based high efficiency quantitative phase microscopy imaging system, the actual hardware platform of the imaging system comprises an LED array, a stage, a condenser, a sample to be tested, and a microscope objective, an imaging tube lens and a camera, the system using an annular illumination pattern and adding a condenser to the light path. The LED array is placed at the front focal plane of the condenser and the center of the LED array is on the optical axis of the microscope objective; the back focal plane of the microscope objective coincides with the front focal plane of the imaging tube lens, and the imaging plane of the camera is placed at the back focal plane position of the imaging tube lens; the sample to be tested on the stage is adjusted to the front focal plane position of the microscope objective during imaging to form an infinity correction imaging system. An annular illumination pattern is displayed on the LED array, and the light emitted by each of the illuminated LED units is converged by the condenser into partially coherent light illuminating the sample to be tested which is placed on the stage. The light passes through the sample to be tested, is concentrated by the imaging tube lens and then reaches the imaging plane of the camera. The stage is then moved along the optical axis and three intensity images are collected.

In order to meet the minimum frequency domain sampling rate required by the imaging method, the numerical aperture of the microscope objective is $NA_{obj}$, and the distance from each lit LED unit on the annular illumination pattern to the center of the LED array is l and satisfies $$NA_{obj} = \frac{l}{\sqrt{l^2 + f^2}},$$

where f is the focal length of the condenser, generally between 10-20 mm. The magnification of the microscope objective is Mag, the pixel size of the camera is $\Delta x_{cam}$, and the wavelength of illumination light is $\lambda$, and satisfies $$\frac{Mag}{4\Delta x_{cam}} \frac{\lambda}{NA_{obj}} > 1.$$

Figure 1:
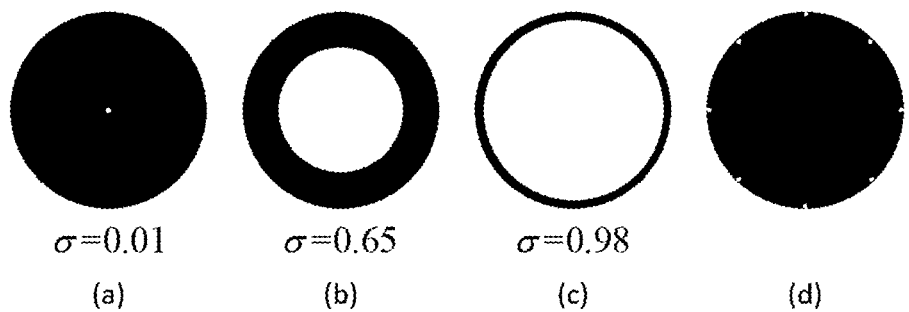
FIG. 1 is a schematic diagram of a light source pattern for a coherent illumination, a partially coherent illumination, and a discrete annular illumination imaging system.

In order to meet the needs of microscope objectives with different numerical apertures, the radius of the annular illumination pattern can be changed through reprogramming, that is, illumination sources always satisfies $$NA_{obj} = \frac{l}{\sqrt{l^2 + f^2}},$$

at this point, the radius of an illumination ring always matches the numerical aperture of an objective lens, as shown in FIG. 1(d).

An LED array includes a plurality of (at least 261) LED units that are equally spaced to form a two-dimensional array. Each of the LED units is colored red, green and blue, and its typical wavelength is red light 633 nm, green light 525 nm, and blue light 465 nm. The typical center distance d between each LED unit is 1-4 mm. An LED array does not need to be independently machined and can be directly purchased on the market. Table 1 shows product parameters of a commercially available LED array. In the LED array, the LED units have 32 rows and 32 columns, 1024 in total, and the brightness of each LED unit is above 2000 cd/m².

TABLE 1

Physical Parameters of the LED Array

| Items | Parameters |
|---|---|
| wavelength of LED unit | red 633 nm, green 525 nm, blue 475 nm |
| number of LED units | 32 × 32 |
| spacing of LED units | 1.67 mm |
| light emitting surface size of LED unit | 150 μm |
| brightness of LED unit | 2000 cd/m² |
| array dimensions | 55 mm × 55 mm × 17 mm |
| weight | 170 g |
| lighting angle | 150° |
| voltage | 5 v |
| current | the maximum 2 A |

Each LED unit in an LED array can be individually illuminated by programming. The specific method of lighting LED units is a conventional technology, and the implementation circuit can adopt (not limited to) existing technology such as a microcontroller unit, an ARM, or a programmable logic device. The specific implementation methods can refer to relevant literature (Guo Baozeng, Deng Yumiao: FPGA-based LED display control system design [J]. LCD and Display, 2010, 25(3): 424-428).

The method for realizing high efficiency quantitative phase microscopy imaging using the imaging system based on the programmable annular LED illumination comprises the following steps:

Step one, the derivation of optical transfer function for a partially coherent imaging system; considering that the optical pupil functions of the illumination source and microscopic objective are symmetric about the optical axis, the optical transfer function under a weak object approximation in a partially coherent illumination imaging system can be derived.

The specific implementation process is: in an infinity-corrected imaging light-path composed of the programmable annular LED illumination-based high efficiency quantitative phase imaging system, the intensity image on the imaging plane for incoherent illumination is $$I(r) = |h(r)|^2 \otimes |t(r)|^2 \otimes I_u(r)$$

wherein r is two-dimensional variables in a spatial domain, and h(r) is an amplitude point spread function of the imaging system. t(r) is the complex amplitude of an object, $I_u(r)$ represents the superposition of the intensity produced by all the point sources on source plane; while the intensity images on the imaging plane for coherent illumination imaging systems can be expressed as:

$$I(r) = |h(r) \otimes t(r)|^2$$

for a partially coherent imaging system, the relationship between the intensity captured on the imaging plane and the imaging system is expressed as:

$$I(r) = a_0^2 TCC(0;0) + 2a_0 \text{Re}\{\int TCC(u;0)[\Delta \tilde{\varphi}(\mathbf{u}) + ia_0 \tilde{\varphi}(\mathbf{u})]\exp(i2\pi r u)du\}$$

where $a_0$ is the average of the amplitudes in the complex amplitude, TCC (0; 0) is the transmitted component of the incident ray to an object, $\tilde{\varphi}(\mathbf{u})$ represents the Fourier transform of the phase of an object, and TCC (u; 0) can be described as the optical transfer function under a weak object approximation (WOTF):

$$WOTF(u) \equiv TCC(u;0) = \iint S(u')P(u'+u)P(u')du'$$

The above formula is the WOTF of the imaging system, where u represents the two-dimensional variable of polar coordinate system in frequency domain, u' is the temporary integral variable in frequency domain, S(u) is the distribution of illumination source on the front focal plane of a concentrator, and P(u) is the pupil function of a microscopic objective, and the absolute value of the optical pupil function can be expressed as:

$$|P(u)| = \begin{cases} 1, & \text{if } u \leq \rho_P \\ 0, & \text{if } u > \rho_P \end{cases}$$

wherein $\rho_P$ is the normalized cutoff frequency of the microscope objective pupil.

Step two, the derivation of the phase transfer function under weak object approximation for a tilted axially symmetric coherent point illumination source; when the illumination degenerates from a circular partially coherent illumination pattern to a tilted axially symmetric coherent point source, the two axially symmetric discrete coherent point sources are matched with the pupil edge of an objective lens, respectively; then these two tilted axially symmetric coherent point sources are mapped to the LED array on the source plane, and the optical transfer function of the imaging system under a weak object approximation can be calculated and finally, the phase contrast intensity image containing phase information is generated by introducing defocus, so that the phase information of a sample can be transmitted to the defocus intensity image.

The specific implementation process is: if the source distribution S(u) and the microscope objective pupil P (u) are axially symmetrically distributed, WOTF is a real function and an even function; when the sample is in-focus, the phase information of object cannot be transmitted to the intensity image; Only when the phase contrast and the imaginary component are introduced into WOTF by axial defocusing mode, the pupil function at the back focal plane of a microscope objective can be expressed as $$P(u) = |P(u)|e^{ikz\sqrt{1-\lambda^2|u|^2}}, |u|\lambda \leq 1$$

then, substituting the pupil function to WOTF and obtaining the complex optical transfer function in the defocus condition:

WOTF(u)=S(u')|P*(u')||P(u'+u)exp[ikz(−√1−λ²+ √1−λ²|u+u'|²)]du' the amplitude transfer function $H_A(u)$ and phase transfer function $H_P(u)$ correspond to the real part and the imaginary part of WOTF, respectively, and these two transfer functions can be expressed as:

$H_A(u)=2a_0\text{Re}[\text{WOTF}(u)]$ $H_P(u)=2a_0\text{Im}[\text{WOTF}(u)]$ where Re and Im labels represent the real part and the imaginary part of the function, respectively; by introducing two tilted axially symmetric coherent point sources on the source planes where LED array is located, and the expression of source distribution S(u) is:

$S(u)=\delta(u-\rho_s)+\delta(u+\rho_s)$ where $\delta$ represents Dirac delta function, and $\rho_s$ is the normalized frequency distance from the point source to the center of the source. S(u) is substituted into WOTF, and the point sources with different $\rho_s$ corresponds to the different distribution of illumination sources. when $\rho_s \neq 0$, the sources generate two-axially symmetric tilted illumination, and the phase transfer function at the moment is:

$H_P(u)_{obi}=|P(u-\rho_s)|\sin[kz(\sqrt{1-\lambda^2|u-\rho_s|^2}-\sqrt{1-\lambda^2|\rho_s|^2})]+|P(u+\rho_s)|\sin[kz(\sqrt{1-\lambda^2|u-\rho_s|^2}-\sqrt{1-\lambda^2|\rho_s|^2})]$ where $|P(u-\rho_s)|$ and $|P(u+\rho_s)|$ are a pair of objective pupil functions shifted by an tilted point source; While $\rho_s=0$, the two shifted pupil functions overlap each other at the center position, and the phase transfer function under the coherent condition is obtained for this situation; The transfer function of the transport of intensity equation is derived by introducing the paraxial approximation and weak defocus approximation. Thus, the transfer function of the transport of intensity equation in the frequency domain is:

$H_P(u)=|P(u)|\sin(\pi\lambda z|u|^2)\approx|P(u)|\pi\lambda z|u|^2$.

Step three, the extension of illumination from an axially symmetric coherence point source to a discrete annular point source; any axially symmetric partially coherent illumination source can be decomposed into a plurality of axially symmetric discrete coherent point sources on the source plane, and the optical transfer function can be treated as an incoherent superposition of each pair of tilted axially symmetric coherent point sources, and when the illumination source is in the shape of a discrete annular illumination pattern composed of discrete LED, the optical transfer function of the annular illumination pattern under the discrete condition can be obtained as well.

The specific implementation process is: any illumination pattern about the axially symmetric partially coherent illumination can be decomposed into a plurality of axially symmetric coherent point sources, And the transfer function of this illumination pattern can be composed of the transfer function incoherent superposition of each pair of tilted axially symmetric coherent point sources, so the annular sources finally displayed on LED array are represented as:

$$S(u) = \sum_{i=0}^{N} \delta(u_i), |u_i| \approx |\rho_p|$$

where N is the number of LEDs on the source plane, the distance from each illuminated LED point source to the center of the LED array is $\rho_p$. Therefore, the annular LED illumination pattern is substantially matching a microscope objective pupil; In order to meet the minimum frequency domain sampling rate required by imaging, the numerical aperture of the microscopic objective lens is $NA_{obj}$. The magnification of imaging system is Mag and the camera pixel size is $\Delta x_{com}$, which satisfies $$\frac{Mag}{4\Delta x_{cam}}\frac{\lambda}{NA_{obj}} > 1;$$

Thus, the phase transfer function of annular LED illumination under the discrete condition can be obtained through the coherence mode decomposition theory;
when the imaging system contains an objective lens with a different numerical aperture, the LED array can be re-programmed to change the size of annular illumination pattern, so the illumination pattern can re-match the pupil of the microscope objective, that is the relationship $$NA_{obj} = \frac{l}{\sqrt{l^2 + f^2}}$$

can be satisfied. In the imaging system, the radius of annular the illumination is always matched with the numerical aperture of the objective lens, and the phase transfer function of annular illumination can be calculated based on the corresponding parameters of optical imaging system.

Figure 3:
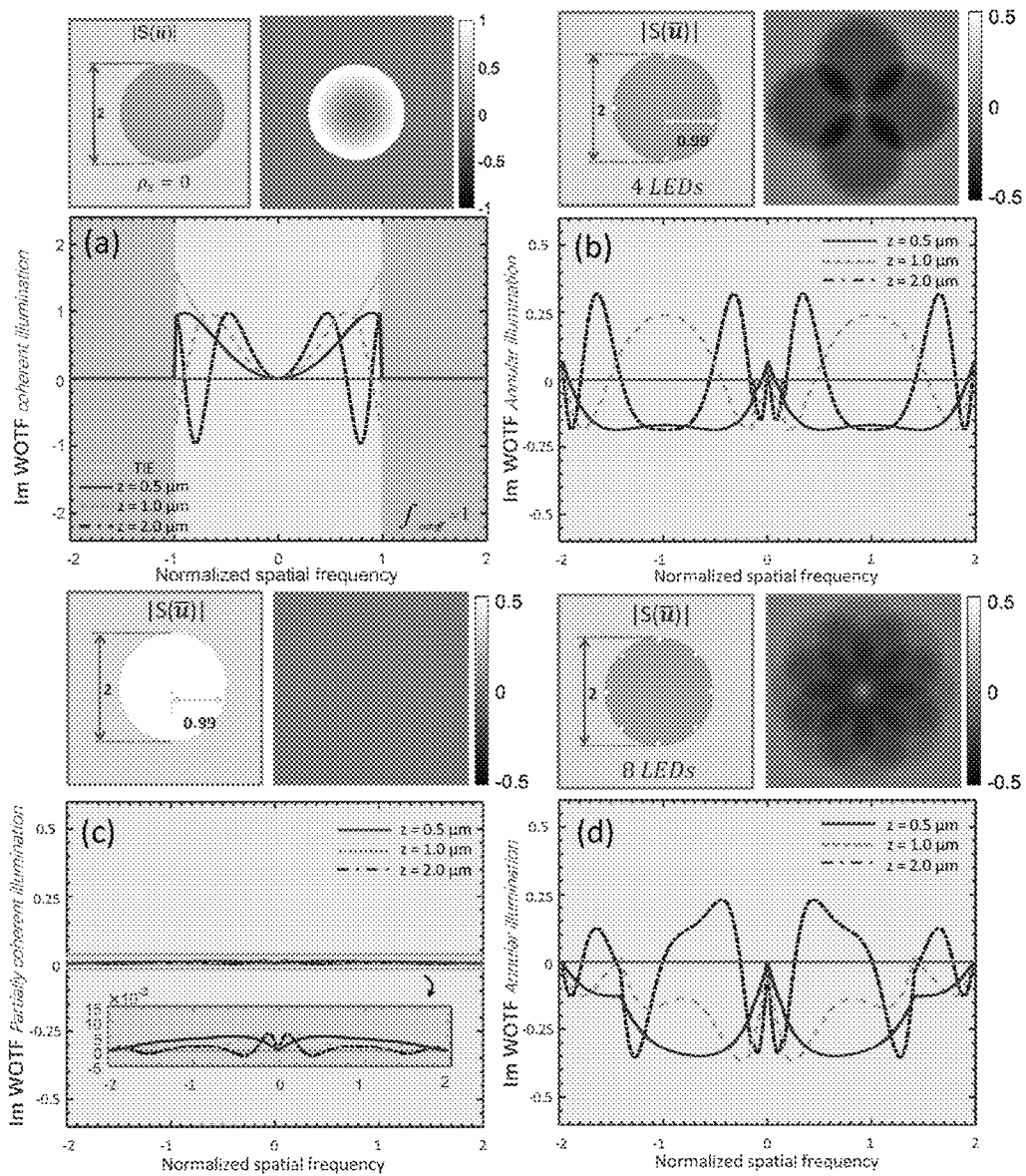
FIG. 3 is a schematic diagram of a comparison of system phase transfer functions corresponding to various illumination source modes at different defocus distances.

As shown in FIG. 3, by comparing the amplitude magnitude of the phase transfer function in the optical system with the illumination modes of different light sources, the phase transfer function of the discrete annular point light source (FIG. 3(b) and FIG. 3(d)) is a basically relatively flat constant in the normalized spatial frequency with no zero crossing point (the zero crossing of transfer function will cause the spatial frequency near the zero crossing to be unrecoverable, so zero crossing of function should be avoided as much as possible); the annular illumination composed of the four LEDs cannot guarantee that the transfer function guarantee sufficient response in most directions, and therefore it can be seen from FIG. 3(d) that the two-dimensional phase transfer function can basically guarantee the spectral response coverage in most directions; Although as shown in FIG. 3(a), The amplitude of the phase transfer function response in the case of coherent illumination is larger, its spatial frequency is limited by the objective lens to coherent diffraction limit, resulting in a final phase reconstruction resolution reduction; although the phase transfer function in FIG. 3(c) can extend the cutoff frequency of the transfer function to twice the objective lens spatial frequency, the response amplitude is around 10', that is, under traditional circular Kohler illumination with coherence parameter σ=0.99, the phase information contained in generated intensity images is insufficient to be detected by a camera; resulting in a very low reconstructed signal to noise ratio.

when an imaging system is switched to a microscope objective with a different numerical aperture, the LED array is re-programmed to change the annular illumination pattern so that it can be re-cut into the pupil of the microscope objective, namely, satisfying $$NA_{obj} = \frac{l}{\sqrt{l^2 + f^2}},$$

at the moment, the radius of the illumination circular ring is always matched with the numerical aperture of the objective lens, and the phase transfer function of the annular illumination corresponding to the parameters of the optical imaging system at the moment is calculated.

Step four, the acquisition of raw intensity dataset; when the annular LED illumination pattern matches the objective lens pupil, the camera is used for the acquisition of two defocus intensity images and an in-focusing intensity image with the movement of stage along the optical axis direction.

Step five, the implementing of deconvolution for quantitative phase reconstruction; three intensity images acquired by the camera are subjected to central axial intensity difference, and the absorption components in the intensity images are removed; and then the Fourier transform is performed, and this transform is corresponding to the dividing of phase transfer function in the frequency domain; moreover, the regularization parameter is added to prevent the occurrence of dividing zero; finally, the inverse Fourier transform is performed to obtain the quantitative phase microscopy image based on annular LED illumination.

The specific implementation process is: the conventional transport of intensity equation is expressed as:

$$-k\frac{\partial I(r)}{\partial z} = \nabla \cdot [I(r)\nabla \phi(r)]$$

where I(r) is the intensity distribution on a focal plane, and ϕ(r) is the phase distribution of object. The transport of intensity equation is solved by using the Poisson equation-based fast Fourier transform, and the detailed formula can be written as the Laplacian filter form in the frequency domain:

$$\frac{\tilde{I}_1(u) - \tilde{I}_2(u)}{4\tilde{I}(u)} = (\pi\lambda z|u|^2)\tilde{\phi}(u)$$

where $\tilde{I}_1(u)$, $\tilde{I}_2(u)$, $\tilde{I}(U)$ are the Fourier transform of three captured intensity images acquired in the case of weak defocus, $\pi\lambda z|u|^2$ is the Laplacian filter function, and the inverse Laplacian function $1/(\pi\lambda z|u|^2)$ corresponds to the inverse form of the phase transfer function in the case of coherent illumination and weak defocus approximation. Generally, the forward form of the optical transfer function under weak object approximation for more general partially coherent illumination can be expressed as:

$$\frac{I_{\Delta z}^{\%} - I_{-\Delta z}^{\%}(u)}{4I_0^{\%}(u)} = \text{Im}[WOTF(u)]\tilde{\phi}^{\%}(u)$$

where the phase transfer function of an imaging system corresponds to the imaginary part of optical transfer function under the weak object approximation. Thus, the Fourier transform of the quantitative phase of an object can be obtained through the inverse form of the phase transfer function, and the quantitative phase distribution of an annular LED illumination can be obtained through inverse Fourier transform:

$$\phi(r) = \mathscr{F}^{-1}\left\{\frac{I_{\Delta z}^{\%} - I_{-\Delta z}^{\%}(u)}{4I_0^{\%}(u)}\frac{\text{Im}[WOTF(u)]}{|\text{Im}[WOTF(u)]|^2 + \alpha}\right\}$$

where $\mathscr{F}^{-1}$ represents the inverse Fourier transform and parameter α represents regularization parameter avoiding the division by zero.

Figure 4:
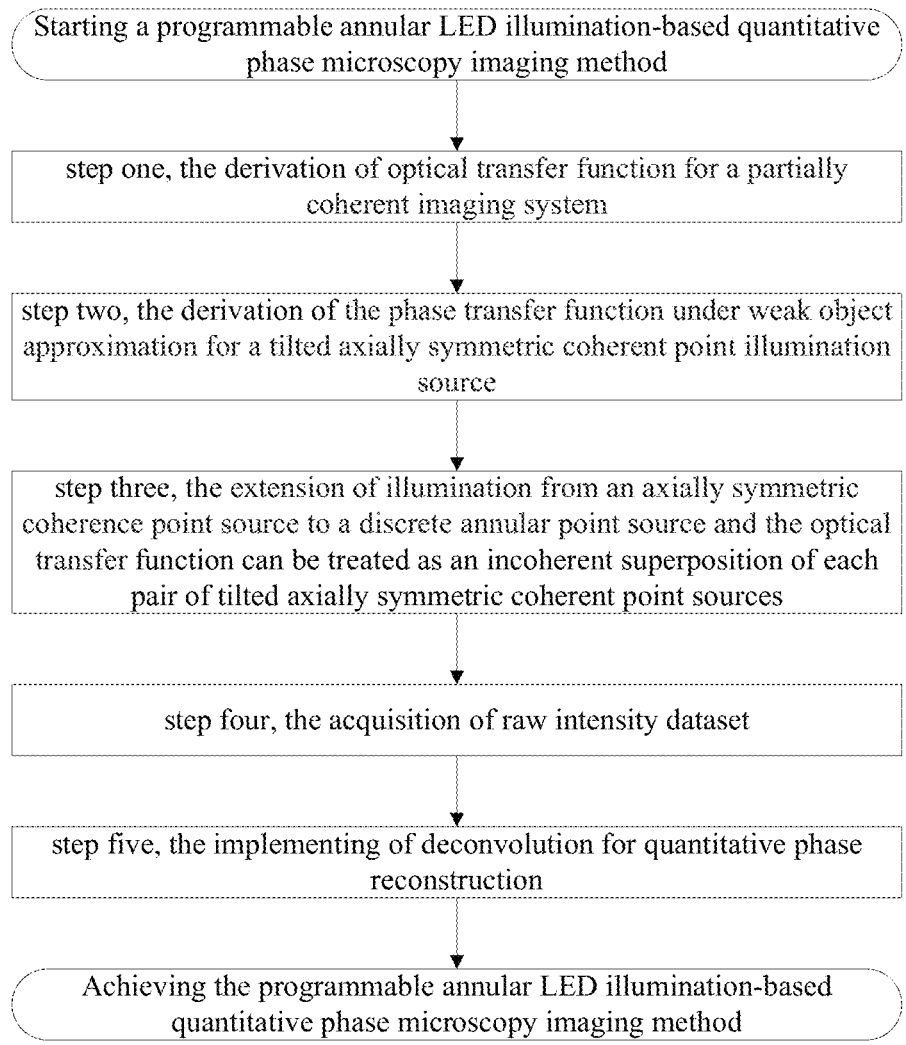
FIG. 4 is a schematic flow chart of the microscopy imaging method of the present invention.
Figure 5:
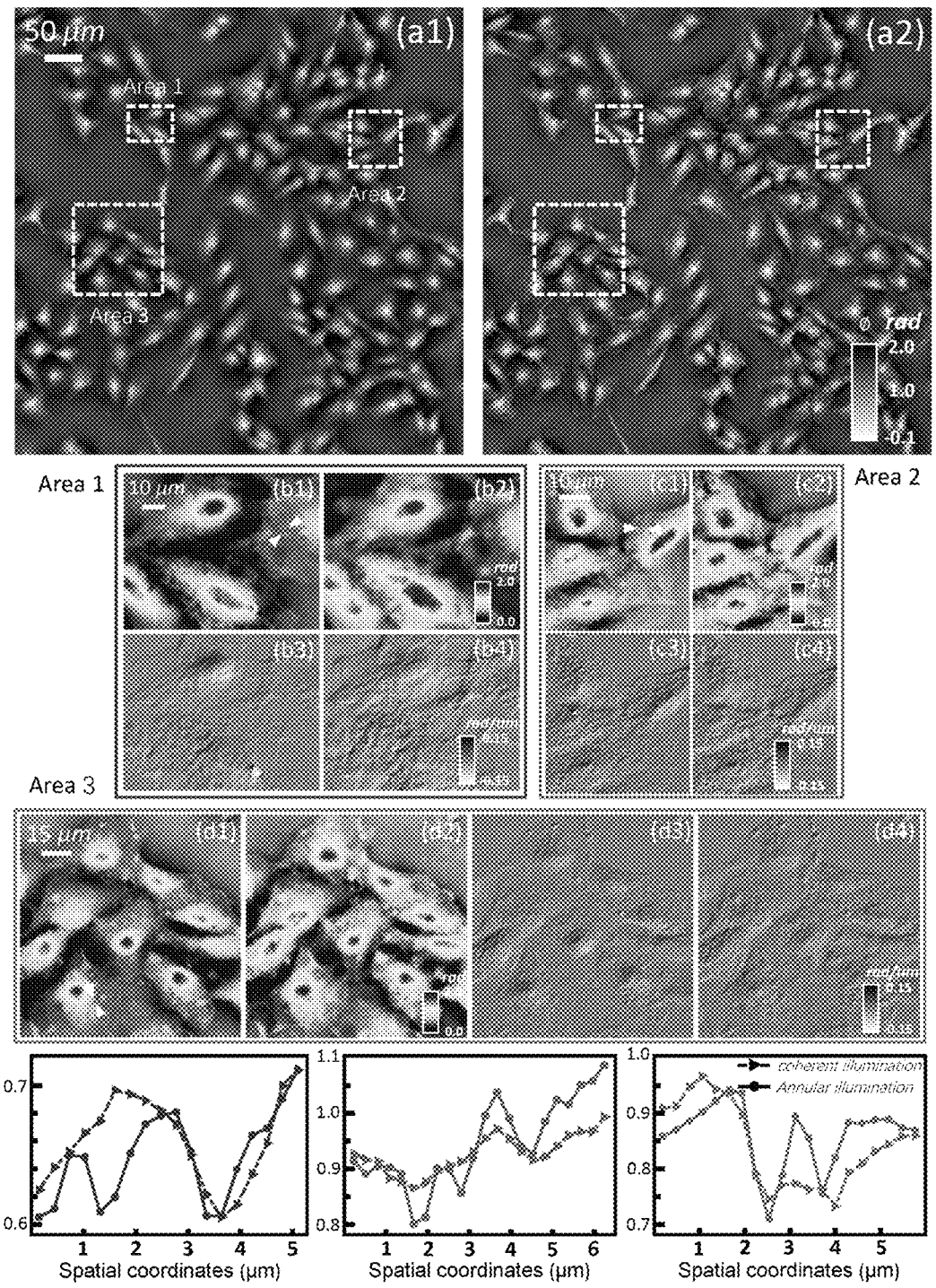
FIG. 5 is a schematic diagram showing the results of quantitative phase imaging of human lung cancer cells by using the imaging method of the present invention.
Figure 6:
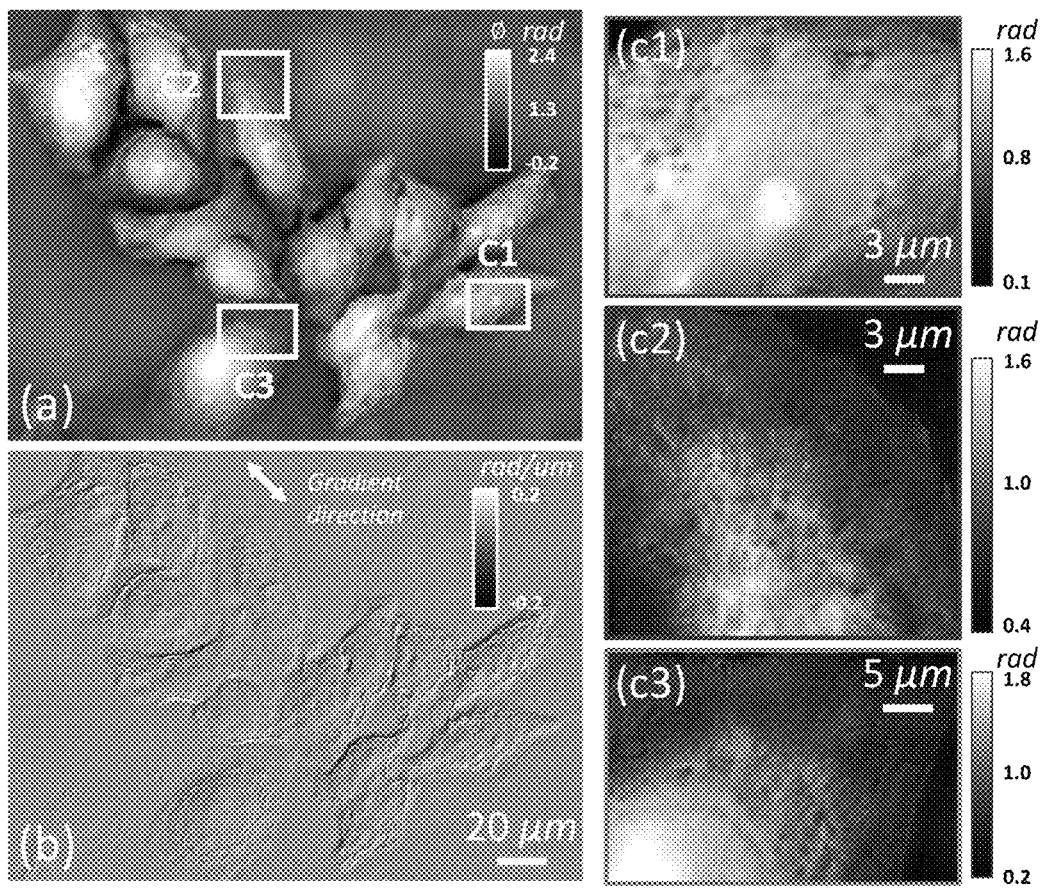
FIG. 6 is a schematic diagram showing the quantitative phase of high resolution human cervical cancer cells obtained by the imaging method of the present invention and a microscopic objective with a high numerical aperture.

As shown in the reconstruction flowchart FIG. 4, the imaging method of the present invention is applied to quantitative phase imaging of unstained human cancer cells through the above steps and procedure, FIG. 5 is the quantitative phase imaging result of the imaging method of the present invention on human lung cancer cells, wherein FIG. 5 (a1) and FIG. 5 (a2) are quantitative phase results on the entire camera imaging region under coherent illumination and annular illumination respectively; three sub-region quantitative phases are selected from FIG. 5 (a) and their phase gradient images are calculated to do comparison, as shown in FIG. 5 (b), FIG. 5 (c) and FIG. 5 (d), the phase imaging resolution under annular illumination is higher than that of a traditional coherent illumination. Two points are respectively selected from three phase sub-regions under the two illumination modes, and the phase change curve between the two points is drawn. From the curve changes, it can be seen that the resolution of annular illumination program double that of conventional coherent illumination (in the first phase one-dimensional drawing post line diagram, the variable aperture frequency of triangular dotted lines is twice the solid line of the original point), so the annular LED illumination proposed by the present invention can achieve twice the imaging resolution of objective lens. FIG. 6 is an obtained high-resolution quantitative phase diagram and a high-resolution phase gradient diagram of human cervical cancer cells by using the imaging method of the present invention and a high numerical aperture microscope objective. The numerical aperture of the microscope objective is 0.75, the annular illumination pattern is matched to the pupil of objective lens by re-programming, and the final imaging resolution is twice resolving power of lens. By selecting three sub-regions to be zoomed in, as shown in FIG. 6(c1)-(c3), the granular organelles in cytoplasm and the nucleus of cervical cancer cells can be clearly observed.

The invention claimed is:

1. A programmable annular LED illumination-based high efficiency quantitative phase microscopy imaging method, comprising:
providing an imaging system comprising an LED array, a stage, a condenser, a sample to be tested, a microscope objective, an imaging tube lens and a camera, the system using an annular illumination pattern and adding the condenser to a light path, wherein the LED array is placed at a front focal plane of the condenser, a center of the LED array is on an optical axis of the microscope objective, a back focal plane of the microscope objective coincides with a front focal plane of the imaging tube lens, an imaging plane of the camera is placed at a back focal plane position of the imaging tube lens, the sample to be tested on the stage is adjusted to a front focal plane position of the microscope objective during imaging to form an infinity correction imaging system, the annular illumination pattern is displayed on the LED array, light emitted by each of the illuminated LED units is converged by the condenser into partially coherent light illuminating the sample to be tested which is placed on the stage, the light passes through the sample to be tested, is concentrated by the imaging tube lens and then reaches the imaging plane of the camera, and the stage is then moved along the optical axis and three intensity images are collected, the method further comprising the steps of:

Step one of deriving an optical transfer function for the imaging system, wherein pupil of an illumination source displayed on the LED array and the microscopic objective are both symmetric about the optical axis, and the Step one further comprises a sub-step of deriving a corresponding expression of the optical transfer function under a weak object approximation in the imaging system;

Step two of deriving a phase transfer function under weak object approximation for a tilted axially symmetric coherent point illumination source on the LED array, wherein the Step two comprises the sub-steps of: degenerating illumination displayed on the LEI) array from a circular partially coherent illumination pattern to a tilted axially symmetric coherent point source; matching two tilted axially symmetric discrete coherent point sources on the LED array with a pupil edge of the microscope objective, respectively; mapping the two tilted axially symmetric coherent point sources to the LED array on the focus plane of the condenser; calculating the corresponding optical transfer function of the imaging system with the LED array illumination pattern under a weak object approximation; generating a phase contrast intensity image containing phase information by introducing defocus, wherein a position of the intensity image does not locate at an in-focus plane; and transmitting the phase information of the sample to the phase contrast intensity image;

Step three of extending illumination displayed on the LED array from an axially symmetric coherence point source to a discrete annular point source, wherein the Step three comprises sub-steps of decomposing an axially symmetric partially coherent illumination source into a plurality of axially symmetric discrete LED coherent point sources on a plane of the LED array; treating the optical transfer function as an incoherent superposition of each pair of tilted axially symmetric coherent point sources; and when the illumination source is in a shape of a discrete annular illumination pattern composed of discrete LED, obtaining the optical transfer function of the annular illumination pattern under the discrete condition;

Step four of acquiring raw intensity dataset by the camera when the annular LED illumination pattern displayed on the LED array matches the pupil of the microscope objective, wherein the raw intensity dataset includes two defocus intensity images and an in-focusing intensity image with the movement of the stage along the optical axis; and Step five of implementing of deconvolution for quantitative phase reconstruction, the Step five comprising the sub-steps of: subjecting the two defocus intensity images and an in-focusing intensity image acquired by the camera to central axial intensity difference; removing absorption components in the intensity images; performing a Fourier transform, wherein the Fourier transform is corresponding to a dividing of phase transfer function in a frequency domain; adding a regularization parameter to prevent an occurrence of dividing zero; and performing an inverse Fourier transform to obtain the quantitative phase microscopic image based on annular LED illumination.

2. The programmable annular LED illumination-based high efficiency quantitative phase microscopy imaging method according to claim 1, wherein the Step one is performed according to the following formulas:

$$I(r)=|h(r)|^2 \otimes |t(r)|^2 \otimes I_u(r),$$

where r is two-dimensional variables in a spatial domain, $h(r)$ is an amplitude point spread function of the imaging system, $t(r)$ is a complex amplitude of an object, $I_u(r)$ represents the superposition of the intensity produced by all the point sources on source plane, $$I(r)=|h(r) \otimes t(r)|^2,$$

$$I(r)=a_0^2 TCC(0;0)+2a_0 \text{Re}\{\int TCC(u;0)[\Delta \tilde{a}(\textbf{u})+ia_0 \tilde{\phi}(\textbf{u})]\exp(i2\pi ru)du\},$$

where $a_0$ is an average of amplitudes in a complex amplitude, TCC (0; 0) is a transmitted component of an incident ray to an object, $\tilde{\phi}(u)$ represents the Fourier transform of the phase of an object, and TCC (u; 0) is described as the optical transfer function under a weak object approximation (WOTF):

$$WOTF(u) \equiv TCC(u;0) = \iint S(u')P(u'+u)P(u')du'$$

where u represents a two-dimensional variable of polar coordinate system in frequency domain, u is a temporary integral variable in frequency domain, S (u) is a distribution of illumination source on the front focal plane of a concentrator, and P (u) is the pupil function of a microscopic objective, and $$|P(u)| = \begin{cases} 1, & \text{if } u \leq \rho_P \\ 0, & \text{if } u > \rho_P \end{cases},$$

where $p_p$ is a normalized cutoff frequency of the microscope objective pupil.

3. The programmable annular LED illumination-based high efficiency quantitative phase microscopy imaging method according to claim 2, wherein the Step two is performed according to the following formulas:

$$P(u) = |P(u)|e^{ikz\sqrt{1-\lambda^2|u|^2}}, |u|\lambda \leq 1,$$

$$WOTF(u) =$$

$$\int S(u')|P^*(u')||P(u'+u)|\exp\left[ikz\left(-\sqrt{1-\lambda^2|u'|^2}+\sqrt{1-\lambda^2|u+u'|^2}\right)\right]du',$$

where amplitude transfer function $H_A(u)$ and phase transfer function $H_P(u)$ correspond to a real part and an imaginary part of WOTF, respectively, and are expressed as:

$$H_A(u)=2a_0\text{Re}[WOTF(u)]$$

$$H_P(u)=2a_0\text{Im}[WOTF(u)]$$

where Re and Im labels represent the real part and the imaginary part of the function, respectively, $$S(u)=\delta(u-\rho_s)+\delta(u+\rho_s)$$

where $\delta$ represents Dirac delta function, $\rho_s$ is a normalized frequency distance from the point source to the center of the source; $S(u)$ is substituted into WOTF, and the point sources with different $\rho_s$ corresponds to the different distribution of illumination sources, $$H_P(u)_{obj}=|P(u-\rho_s)|\sin[kz(\sqrt{1-\lambda^2|u-\rho_s|^2}-\sqrt{1-\lambda^2|\rho_s|^2})]+|P(u+\rho_s)|\sin[kz(\sqrt{1-\lambda^2|u-\rho_s|^2}-\sqrt{1-\lambda^2|\rho_s|^2})],$$

where $|P(u-\rho_s)|$ and $|P(u+\rho_s)|$ are a pair of objective pupil functions shifted by an tilted point source, and $$H_P(u)=|P(u)|\sin(\pi\lambda z|u|^2)\approx|P(u)|\pi\lambda z|u|^2.$$

4. The programmable annular LED illumination-based high efficiency quantitative phase microscopy imaging method according to claim 1, wherein in the Step three, annular sources finally displayed on LED array are represented as:

$$S(u) = \sum_{i=0}^{N}\delta(u_i), |u_i| \approx |\rho_p|$$

where N is number of LEDs on the source plane, a distance from each illuminated LED point source to a center of the LED array is $\rho_p$, a numerical aperture of the microscopic objective lens is $NA_{obj}$, magnification of imaging system is Mag, and a camera pixel size is $\Delta x_{cam}$, which satisfies $$\frac{Mag}{4\Delta x_{cam}}\frac{\lambda}{NA_{obj}} > 1.$$

5. The programmable annular LED illumination-based high efficiency quantitative phase microscopy imaging method according to claim 1, wherein the Step five is performed according to the following formulas of:

$$-k\frac{\partial I(r)}{\partial z} = \nabla \cdot [I(r)\nabla\phi(r)],$$

$$\frac{\tilde{I}_1(u) - \tilde{I}_2(u)}{4\tilde{I}(u)} = (\pi\lambda z|u|^2)\tilde{\phi}(u),$$

$$\frac{\tilde{I}_{\Delta z} - \tilde{I}_{-\Delta z}(u)}{4\tilde{I}_0(u)} = \text{Im}[WOTF(u)]\tilde{\phi}(u),$$

and $$\phi(r) = \mathscr{F}^{-1}\left\{\frac{\tilde{I}_{\Delta z} - \tilde{I}_{-\Delta z}(u)}{4\tilde{I}_0(u)}\frac{\text{Im}[WOTF(u)]}{|\text{Im}[WOTF(u)]|^2 + \alpha}\right\},$$

where $I(r)$ is the intensity distribution on a focal plane, $\phi(r)$ is a phase distribution of an object, $\tilde{I}_1(u), \tilde{I}_2(u), \tilde{I}(U)$ are Fourier transform of three captured intensity images acquired in the case of weak defocus, $\pi\lambda z|u|^2$ is a Laplacian filter function, an inverse Laplacian function $1/(\pi\lambda z|u|^2)$ corresponds to the inverse form of the phase transfer function in the case of coherent illumination and weak defocus approximation, $\mathscr{F}^{-1}$ represents the inverse Fourier transform, and parameter $\alpha$ represents regularization parameter avoiding the division by zero.

* * * * *